United States Patent [19]

O'Brien, Jr.

[11] Patent Number: 4,681,334

[45] Date of Patent: Jul. 21, 1987

[54] BOAT LAUNCHING APPARATUS

[76] Inventor: William D. O'Brien, Jr., 4483 Francis Ct., Lilburn, Ga. 30247

[21] Appl. No.: 881,949

[22] Filed: Jul. 7, 1986

[51] Int. Cl.$^4$ .................................................. B60P 3/10
[52] U.S. Cl. .................................. 280/414.1; 414/475
[58] Field of Search ............. 280/414.1, 414.2, 414.5, 280/405 R, 405 A, 475, 656, 427; 414/462, 474, 475; 298/20 R, 5

[56] References Cited

U.S. PATENT DOCUMENTS

| | | | |
|---|---|---|---|
| 2,700,480 | 1/1955 | Triplett | 280/414.1 |
| 3,097,755 | 7/1963 | Fulcher | 280/414.1 |
| 3,138,271 | 6/1964 | De Lay | 280/414.1 |
| 3,226,162 | 12/1965 | Eberle | 280/414.1 |
| 3,348,860 | 10/1967 | Buckles | 280/414.1 |
| 3,472,406 | 10/1969 | Slipp | 414/475 |
| 3,585,582 | 6/1971 | Dove | 280/414.1 |
| 3,604,721 | 9/1971 | Hulverson | 280/656 |
| 3,841,663 | 10/1974 | Proffit | 280/475 |

Primary Examiner—John J. Love
Assistant Examiner—Everett G. Diederiks, Jr.

[57] ABSTRACT

A boat trailer having a carriage assembly which can move longitudinally with respect to its supporting wheel assembly. Due to this arrangement, the supporting wheels of the trailer do not have to be submerged in water in order to launch the boat thereby preserving the wheel bearing lift. Also provided is a retractable auxiliary wheel assembly at the rear of the carriage assembly to support the same when the carriage is moved rearward with respect to the supporting wheel assembly.

6 Claims, 9 Drawing Figures

BOAT LAUNCHING APPARATUS

This invention relates to an apparatus for launching boats and more particularly to an apparatus for launching boats without the wheel bearings entering the water.

BACKGROUND OF THE INVENTION

At the present time boats are launched, in most cases, from trailers. These trailers are backed down ramps until the boat becomes mostly buoyant, and the boat is then driven off. When loading the boat back onto the trailer, the process in reversed. This process allows the high-speed wheel bearings to be submerged in water (fresh or salt) twice for each boating day. This exposure to water deteriorates the high-speed bearings of the wheels unless frequent repacking of the bearings is performed. This maintenance procedure needs to be much more frequently performed in the case of salt water launchings.

SUMMARY OF THE INVENTION

This invention, therefore, is a new and improved apparatus to prevent exposure to water, of boat trailer wheel bearings.

BRIEF DESCRIPTION OF THE DRAWINGS

Objects and features of the present invention will be more readily understood from the following detailed description thereof when read in conjunction with accompanying drawings in which.

DETAILED DESCRIPTION

Figure 1:
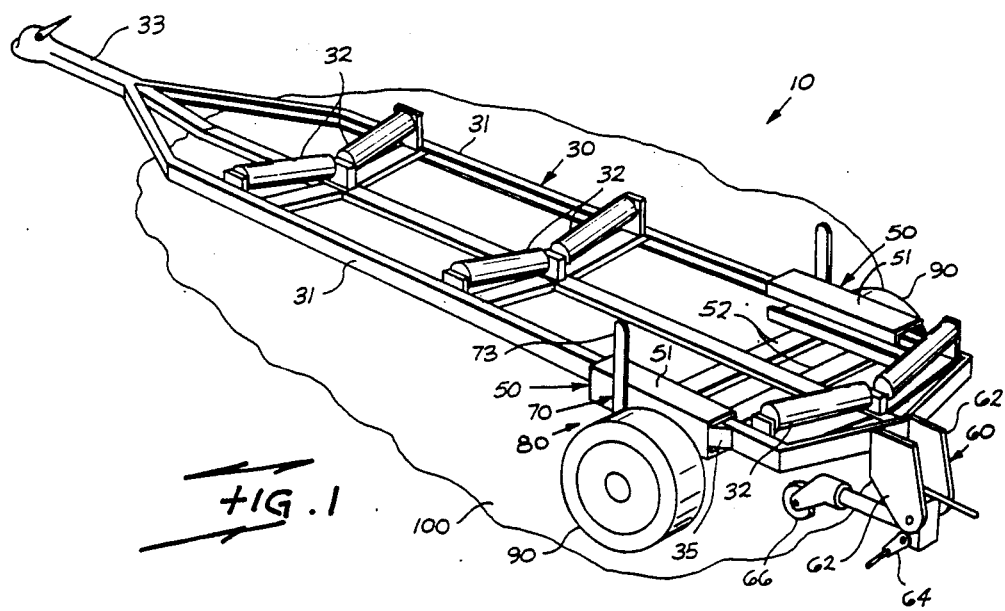
FIG. 1 is a perspective view showing a boat trailer with new and improved devices in accordance with the principles of the invention.

Referring now to FIG. 1 a boat trailer is shown and designated generally by the reference numeral 10. Appearing very similar to the present art in boat trailers, it in fact has several major differences. Present art boat trailers have primarily one assembly. The trailer in FIG. 1 has two main assemblies, a carriage 30, a transport assembly 50, and three sub-assemblies—a load bearing wheel assembly 60, a carriage locking assembly 70 and a braking assembly 80.

Figure 2:
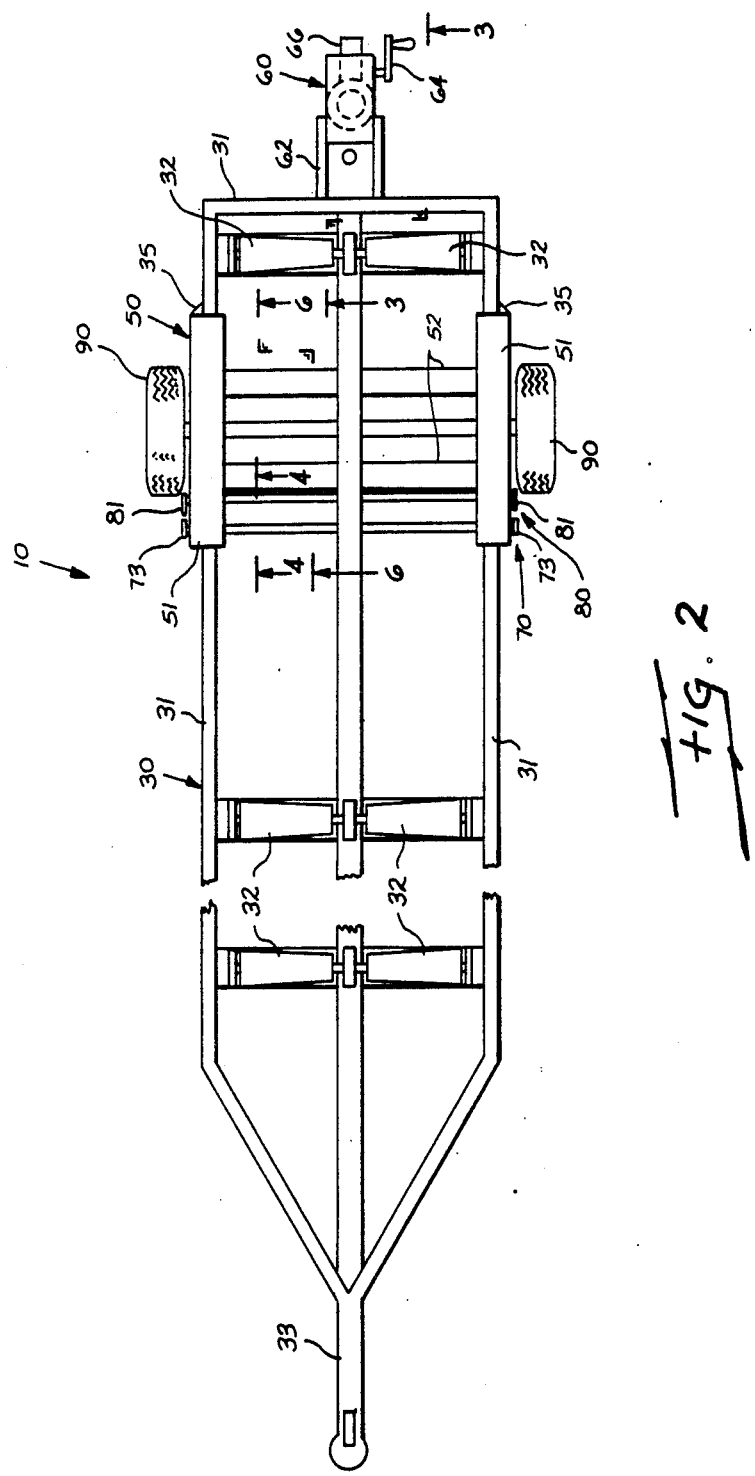
FIG. 2 is a plan view of the same trailer in accordance with the principles of the invention.

Referring now to FIG. 1 and FIG. 2, which are both entire views of the trailer 10, the carriage assembly 30 is fabricated from channel members 31, with the addition of rollers 32, which is typical of present art trailers. An addition to the carriage assembly 30, is a load bearing wheel assembly 60, which is explained in more detail below.

Figure 3:
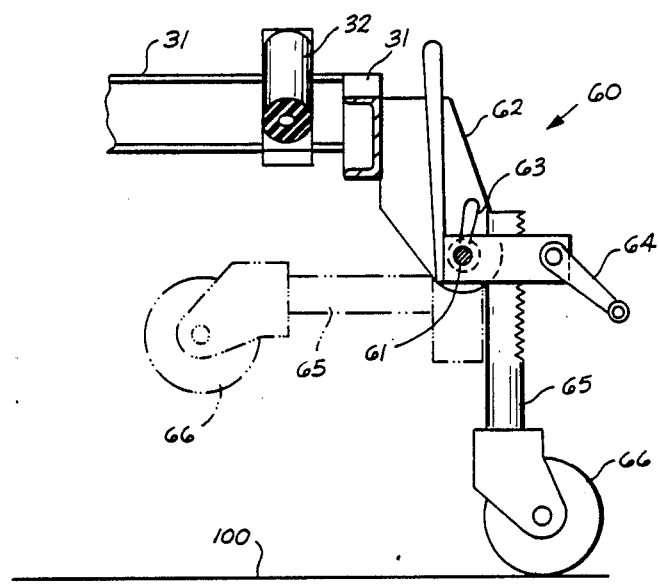
FIG. 3 is a sectional view taken along lines 3—3 of FIG. 2, showing details of a load bearing wheel assembly in accordance with the principles of this invention.

Referring now to FIG. 3, the load bearing wheel assembly 60 is fixed to the rear end channel member 31 and is similar to dolly wheels used on the tongues of present art trailers. The assembly 60 is pivotably mounted on shaft 61 which is supported between two parallel plates 62-62 welded to channel member 31. The assembly is locked in the position (shown in phantom) by an internal detent working on shaft 61. Depressing lever 63 deactivates the detent and lets the assembly 60 swing down, and again lock into the vertical position (shown in solid). The crank handle 64 is turned to lower wheel shaft 65 and wheel 66 until the wheel 66 engages the ramp surface 100, supporting the rear end of the carriage assembly 30 for subsequent operations to be explained later.

Referring again to FIG. 1 and FIG. 2 the transport assembly 50 is slideably mounted to the carriage assembly 30. Two roller housings 51-51 are located on each side of the carriage assembly 30 and are rigidly attached to each other by channel members 52-52 shown in FIG. 1, FIG. 2 and FIG. 6. In operation, the side channels 31 slide within the roller housing 51-51 on upper and lower rollers 53A and 53B, respectively. The rollers 53A and 53B, preferably made of teflon, are rotatably mounted between the vertical web 55 and the lip 56, of the roller housing 51, by shoulder bolts 57, as best seen in FIG. 5.

A locking assembly 70 is also attached to the transport assembly 50 to preclude movement between the carriage 30 and transport assembly 50 when desired.

Figure 4:
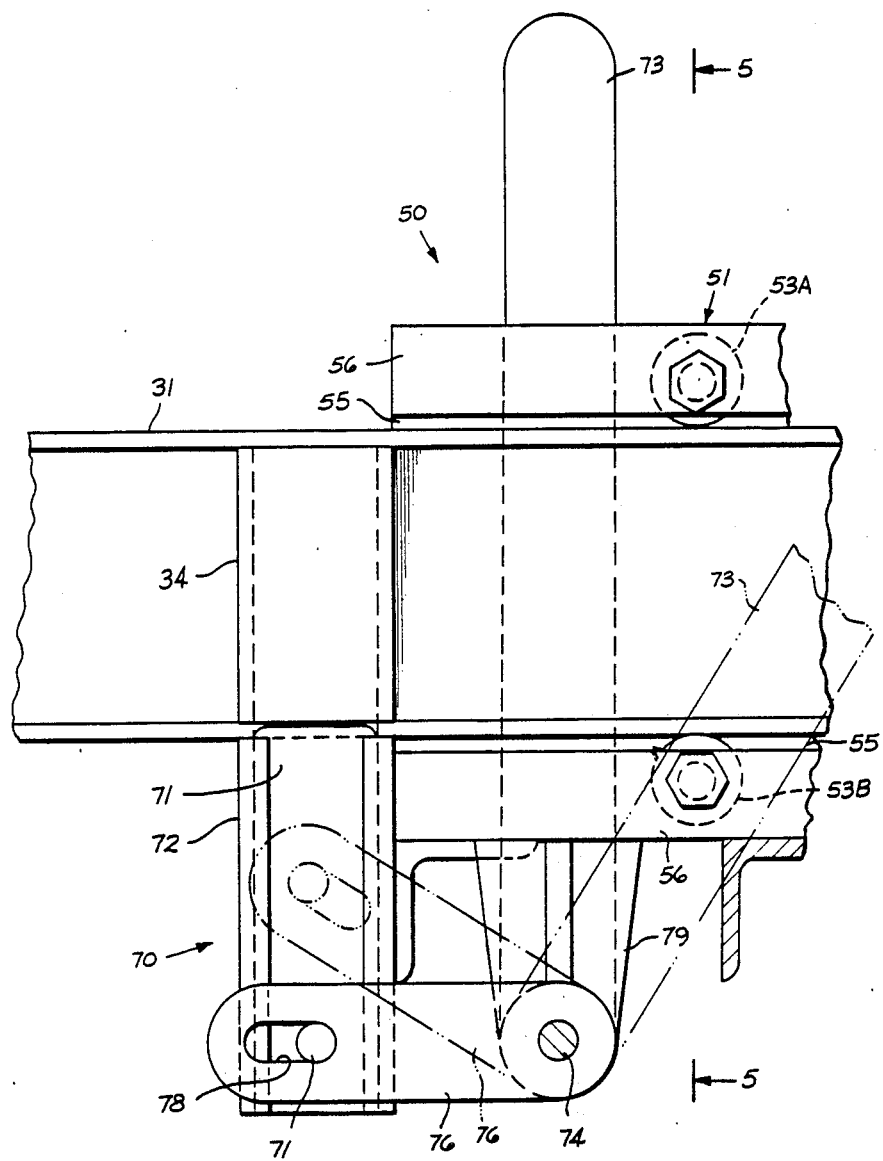
FIG. 4 is a sectional view taken along lines 4—4 of FIG. 2 showing details of a locking assembly in accordance with the principles of this invention.
Figure 5:
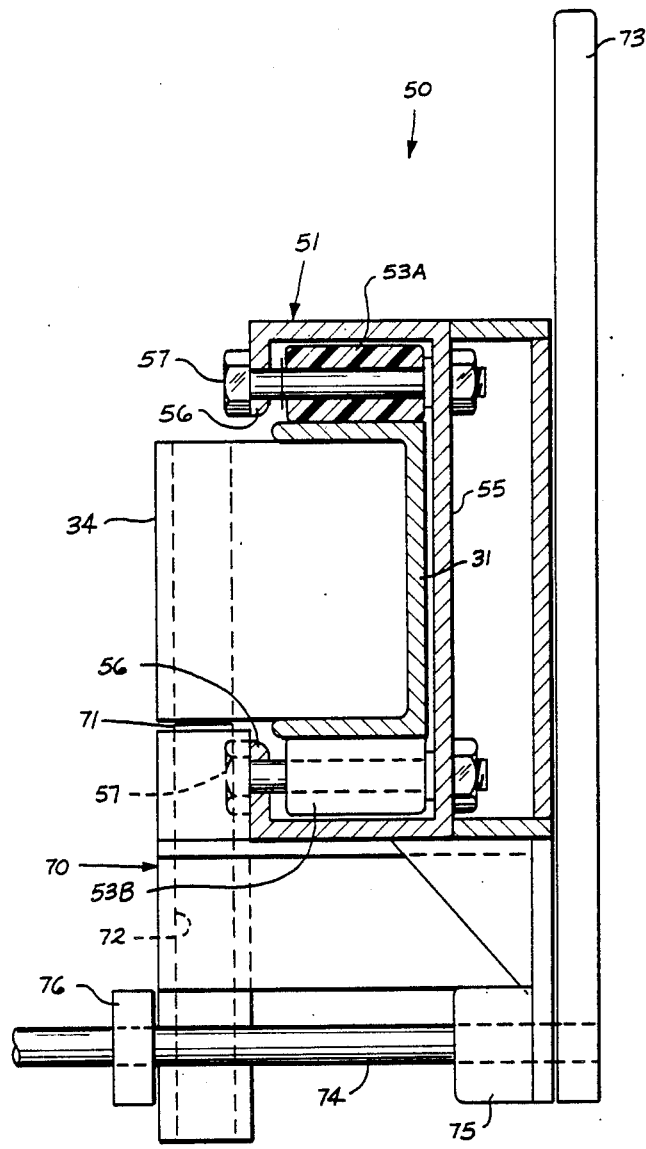
FIG. 5 is a sectional view taken along lines 5—5 of FIG. 4 showing further details of the locking assembly in accordance with the principles of this invention.

Referring now to FIGS. 4 and 5, this locking assembly 70 is attached to the lower forward end of both roller housings 51. The latch 71 is driven from its lower housing 72, by rearward movement of the handle 73. The handle 73 is fixed to a shaft 74, supported by bearings 75 attached to each roller housing 51 by brackets 79. The handle 73 can be attached to one, or both ends of shaft 74. Movement of the handle 73, to the position shown in phantom, also rotates cam lever 76, thus raising latch 71, by a camming motion imparted to the pin 77, which is fixed to and projects from latch 71 and works in slot 78. The raised latch 71 slides partially from its lower housing 72 and partially into an upper housing 34 formed by a "C" shaped channel and fixed to the inner side of outside channel members 31. In this position, movement between carriage assembly 30 and transport assembly 50, is impossible. How this assembly aids in the total operation of the apparatus will be apparent later.

Figure 6:
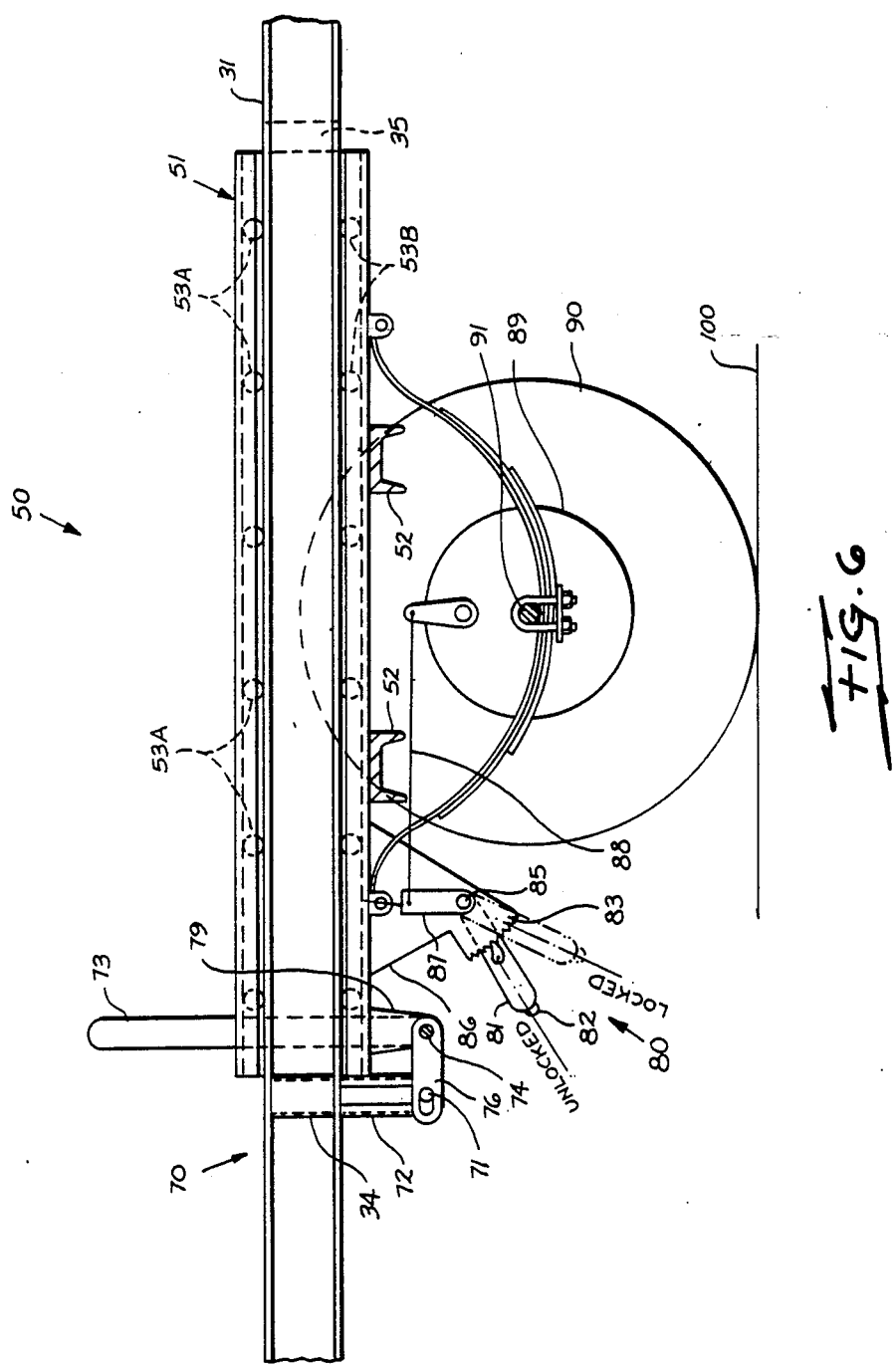
FIG. 6 is a sectional view taken along lines 6—6 of FIG. 2 showing details of the braking assembly.

Referring now to FIG. 6, a braking assembly 80, completed the trailer 10. This assembly is also attched to the lower forward end of both roller housings 51 but slightly to the rear of locking assembly 70. This assembly is the same assembly used conventionally in automobiles for emergency braking and is used here also for braking. It should be understood that an electrical braking system, used frequently on boat trailers, could be used. A braking handle 81 is released by depressing button 82 from its engagement with toothed portion 83 of bearing brackets 86, and rotated to the position shown in phantom (FIG. 6). The brake lever 81 is fixed to shaft 85 which is supported by bearing brackets 86 on each roller housing 51. The rotation of the brake lever 81 also rotates an arm 87, which is fixed to shaft 85, and having a cable 88 linked to a standard brake unit located in each wheel bearing and brake housing 89. At this point, button 82 is released locking the brakes "on" and precluding rotation of wheels 90, with respect to axle 91.

Operation

Figure 7A:
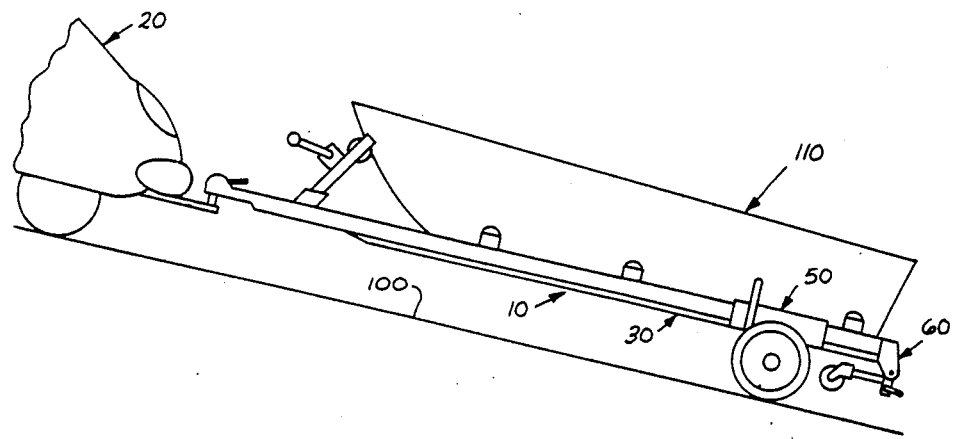
FIG. 7A is a side view showing a tow vehicle, boat and trailer in a position in preparation for launching in accordance with the principles of this invention.

Referring now to FIG. 7A a tow vehicle 20 has backed the trailer 10 down a standard ramp 100 to a "pre-launch" position. At the "prelaunch" position the load bearing wheel assembly 60 is activated to lower wheel 66 to a position in contact with the ramp 100. It should be noted that this wheel is similar to a dolly wheel used on the tongue of many recreational trailers, as mentioned earlier, and is inexpensive and not subject to the high revolutional stress of highway travel as are the precision bearings of wheels 90.

Figure 7B:
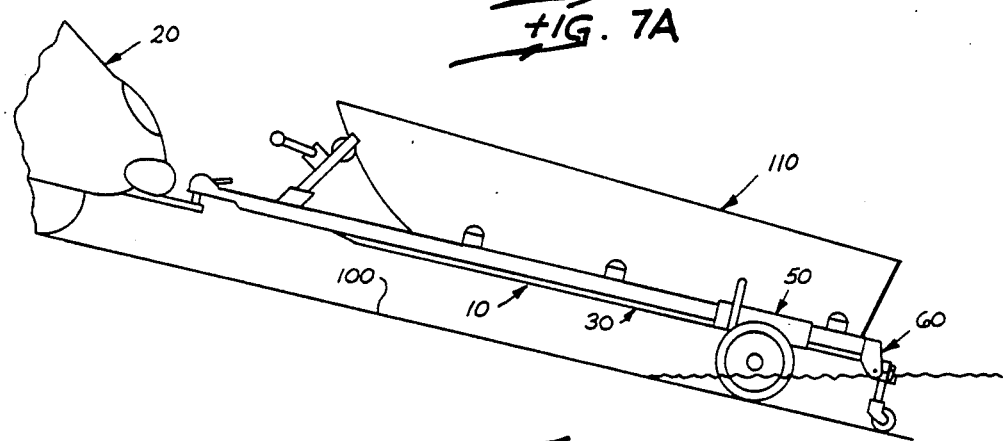
FIG. 7B is a side view showing a tow vehicle, boat and trailer in a mid-launch position in accordance with the principles of this invention.

The tow vehicle 20 is now further backed down the ramp 100, to a "mid-launch" position, shown in FIG. 7B. This position allows the wheels 90-90 to just enter the water without submerging the internal wheel bearings.

The brake lever 81 (FIG. 6) is pushed to a position shown in phantom, to mechanically lock brakes within the housing 89-89, and to preclude the further advance of the transport assembly 50 down the ramp 100. Next referring to FIG. 4, the handle 73 is pushed from the phantom position to the one shown in solid, unlocking the transport assembly 50 from the carriage assembly 30 by lowering latch 71.

Figure 7C:
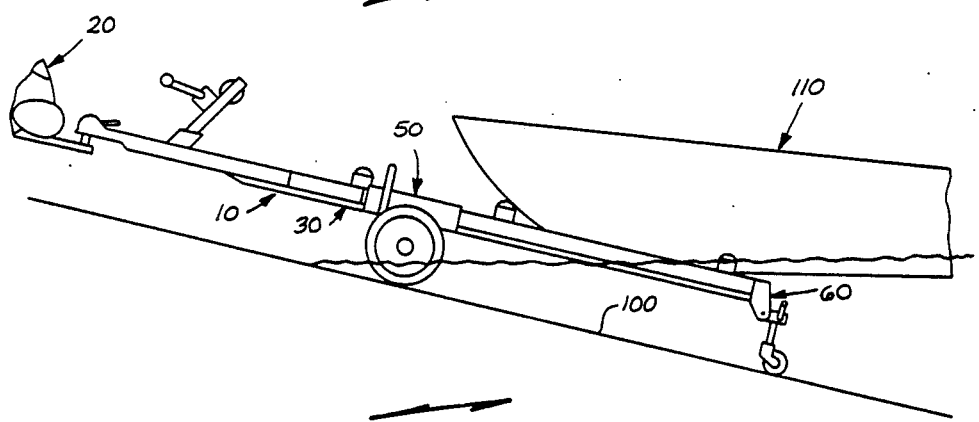
FIG. 7C is a side view showing a tow vehicle, boat and trailer in a launching position in accordance with the principles of this invention.

Next the tow vehicle 20 is advanced further down the ramp 100 until the carriage assembly 30, sliding thru the now stationary transport assembly 50 and rolling on wheel 66, arrive at the "launch" position (FIG. 7C).

The boat 110 now becomes buoyant, free from the trailer 10 and can be driven away. The tow vehicle 20 is now pulled forward to the "mid-launch" position shown in FIG. 7B. The carriage assembly 30 in returning to the "mid-launch" position again slides thru the stationary transport assembly 50. Stopping relative movement between the carriage 30 and transport assembly 50 and precisely aligning lower housing 72 and upper housing 34 of locking assembly 70 are stops 35-35 (FIGS. 1 and 2) fixed to the outer sides of channel members 31-31. From this point, the operation is reversed and the tow vehicle 20 and trailer 10 are moved to a parking position until loading of the boat 110 is desired.

It is to be pointed out that this trailer 10 can indeed be used exactly as is presently being done with prior art trailers, if desired. This however voids the maintenance advantages.

It is to be understood that the above-described arrangements are simply illustrative of the invention. Other arrangements may be devised by those skilled in the art which will embody the principles of the invention and fall within the spirit and scope thereof.

What is claimed is:

1. A trailer assembly for transporting, launching and loading boats comprising, in combination, a carriage assembly for carrying a boat, and a transport assembly for supporting said carriage assembly;

said carriage assembly having first and second, laterally spaced longitudinal frame members extending from the front to the rear of said carriage assembly, the front ends of said longitudinal frame members having means for directly connecting said carriage assembly to a towing vehicle, said first and second frame members extending through first and second elongated housing members respectively, said housing members being affixed to said transport assembly and adapted to permit free longitudinal movement of said frame members relative to said transport assembly in a single plane;

said transport assembly comprising first and second transport wheels mounted to said first and second housing members respectively, and locking means mounted on at least one of said housing members and adapted to engage at least one of said longitudinal frame members to prevent relative movement between said carriage assembly and said transport assembly, said locking means including means for disengaging said locking means from said longitudinal frame member to permit free longitudinal movement of said carriage assembly relative to said transport assembly;

said transport assembly further including braking means for locking said transport wheels; and a load bearing wheel assembly comprising a pair of laterally spaced plates affixed to the rear end of said carriage assembly, a support shaft having one end pivotally mounted between said plates so as to be movable between an operating position wherein the support shaft is perpendicular to said carriage assembly and a transport position wherein said support shaft is substantially parallel to said carriage assembly, a detent shaft mounted between said plates for holding said support shaft in either of said positions and means for releasing said detent shaft to permit movement of said support shaft between the two positions, and a load bearing wheel rotatably mounted to the other end of said support shaft, said load bearing wheel assembly including means to adjust said load bearing wheel up or down when said support shaft is in the operating position for causing said load bearing wheel to contact the ground, thereby supporting the rear end of said carriage assembly.

2. A trailer assembly as claimed in claim 1, wherein each of said housing members comprises a C-shaped channel member having top and bottom vertical lips at the open side, and a plurality of rollers extending between the top vertical lip toward the closed side of said channel member and between the bottom vertical lip and the closed side of said channel member, said rollers being positioned to engage the frame member extending through said housing member to facilitate movement thereof relative to said housing member.

3. A trailer assembly as claimed in claim 2, wherein said rollers are made of Teflon ®.

4. A trailer assembly as claimed in claim 1, wherein said locking means is mounted on the underside of the forward end of at least one of said housing members and comprises a latch member, a housing for slideably containing said latch member, a pin mounted on said latch member, a cam lever having a slot therein at one end engaging said pin, the other end of said cam lever being fixed to a rotatable shaft, and means for rotating said shaft to actuate said cam lever and move said latch from its housing into engagement with said longitudinal frame member, and out of engagement by opposite rotation of said shaft.

5. A trailer assembly as claimed in claim 4, wherein said longitudinal frame member has mounted thereon a latch housing into which said latch is driven by upward movement of said cam lever.

6. A trailer assembly as claimed in claim 1, wherein said braking means comprises first and second bearing brackets mounted to the underside of said first and second housing members respectively, a shaft extending between said brackets and rotatably mounted thereto, an arm affixed to the shaft adjacent each of said bearing brackets, cable means attached to each of said arms and to the brake mechanism of each of said transport wheels, an arc-shaped toothed member affixed to one of said bearing brackets, an actuating arm affixed to said shaft and engaging the teeth of said toothed member, and means for disengaging said arm from said toothed member.

* * * * *